US010975717B2

(12) United States Patent
Moniz et al.

(10) Patent No.: US 10,975,717 B2
(45) Date of Patent: Apr. 13, 2021

(54) TORQUE MONITORING DEVICE FOR A GAS TURBINE ENGINE

(71) Applicant: General Electric Company, Schenectady, NY (US)

(72) Inventors: Thomas Ory Moniz, Loveland, OH (US); Joseph George Rose, Mason, OH (US); Robert Harold Weisgerber, Loveland, OH (US); Jeffrey Donald Clements, Mason, OH (US); Brandon Wayne Miller, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 429 days.

(21) Appl. No.: 15/382,817

(22) Filed: Dec. 19, 2016

(65) Prior Publication Data
US 2018/0171816 A1   Jun. 21, 2018

(51) Int. Cl.
*F01D 17/04* (2006.01)
*F02C 7/36* (2006.01)
*F02K 3/06* (2006.01)

(52) U.S. Cl.
CPC ............. *F01D 17/04* (2013.01); *F02C 7/36* (2013.01); *F02K 3/06* (2013.01); *F05D 2220/32* (2013.01);
(Continued)

(58) Field of Classification Search
CPC .. F01D 17/04; F05D 2220/32; F05D 2260/80; F05D 2260/40311;
(Continued)

(56) References Cited

U.S. PATENT DOCUMENTS 2,724,266 A   11/1955   Baker et al.
3,190,113 A    6/1965   Richmond
(Continued)

FOREIGN PATENT DOCUMENTS

CN    2694245 Y    4/2005
CN  102037339 A    4/2011
(Continued)

OTHER PUBLICATIONS

Chinese Office Action Corresponding to Application No. 201711379858 dated Sep. 4, 2019.
(Continued)

*Primary Examiner* — John Kwon
*Assistant Examiner* — Johnny H Hoang
(74) *Attorney, Agent, or Firm* — Dority Manning, P.A.

(57) ABSTRACT

A gas turbine engine includes a fan section having a fan rotatable with a fan shaft and a turbomachinery section having a turbine and a turbomachine shaft rotatable with the turbine. A power gearbox is also provided mechanically coupled to both the fan shaft and the turbomachine shaft such that the fan shaft is rotatable by the turbomachine shaft across the power gearbox. A torque monitoring system includes a gearbox sensor operable with a gear of the power gearbox and a shaft sensor operable with at least one of the turbomachine shaft or the fan shaft. The torque monitoring system determines an angular position of the gear of the gearbox relative to at least one of the fan shaft or the turbomachine shaft using the gearbox sensor and the shaft sensor to determine a torque within the gas turbine engine.

19 Claims, 10 Drawing Sheets

(52) U.S. Cl.
CPC *F05D 2260/40311* (2013.01); *F05D 2260/80* (2013.01); *F05D 2270/331* (2013.01); *F05D 2270/335* (2013.01)

(58) Field of Classification Search
CPC ......... F05D 2270/331; F05D 2270/335; F02C 7/36; F02K 3/06
See application file for complete search history.

(56) References Cited

U.S. PATENT DOCUMENTS

| | | | |
|---|---|---|---|
| 3,688,505 A * | 9/1972 | Dison | F02C 3/113 60/226.1 |
| 4,176,547 A | 12/1979 | McClure et al. | |
| 4,213,333 A | 7/1980 | Krieger et al. | |
| 5,172,774 A | 12/1992 | Melrose | |
| 6,895,741 B2 * | 5/2005 | Rago | F01D 15/10 60/226.1 |
| 8,464,598 B2 | 6/2013 | Cazaux et al. | |
| 8,549,931 B2 | 10/2013 | Bodin | |
| 9,316,159 B2 * | 4/2016 | Dubreuil | F02C 7/36 |
| 10,094,295 B2 * | 10/2018 | Ullyott | F02C 7/36 |
| 2008/0149445 A1 * | 6/2008 | Kern | F01D 15/10 192/3.56 |
| 2011/0208400 A1 * | 8/2011 | Lickfold | F02C 9/32 701/100 |
| 2013/0039764 A1 * | 2/2013 | Perkinson | B64C 11/306 416/129 |
| 2016/0010589 A1 * | 1/2016 | Rolt | F01D 13/003 60/226.1 |
| 2016/0122039 A1 | 5/2016 | Ehinger et al. | |
| 2016/0178464 A1 * | 6/2016 | Burns | F02C 3/10 73/112.01 |
| 2017/0082031 A1 * | 3/2017 | Miller | F01D 25/28 |
| 2018/0058330 A1 * | 3/2018 | Munevar | F02C 7/275 |
| 2018/0202358 A1 * | 7/2018 | Julien | F02C 5/06 |

FOREIGN PATENT DOCUMENTS

| | | |
|---|---|---|
| CN | 102607751 A | 7/2012 |
| CN | 103085861 A | 5/2013 |
| EP | 2436949 A1 | 4/2012 |
| GB | 596983 A | 1/1948 |

OTHER PUBLICATIONS

Combined Chinese Office Action and Search Report Corresponding to Application No. 201711379858 dated Sep. 28, 2020.

* cited by examiner

TORQUE MONITORING DEVICE FOR A GAS TURBINE ENGINE

FIELD

The present subject matter relates generally to a torque monitoring device for a gas turbine engine, and a method for using the same.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The fan of the gas turbine engine is typically driven by a shaft or spool coupled to a turbine within the turbine section of the gas turbine engine. For certain gas turbine engines, a power gearbox is provided, with the spool driving the fan across the power gearbox. Such a drive system may allow for the turbine to turn at increased rotational speeds, while still allowing for a relatively efficient fan rotational speed.

The inventors of the present disclosure have discovered, however, that it may be beneficial to monitor a health of the drive system for the fan during operation of the gas turbine engine by monitoring a torque or horsepower within the engine. Accordingly, a torque monitoring system for monitoring a torque within the gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a fan section including a fan rotatable with a fan shaft, a turbomachinery section including a turbine and a turbomachine shaft rotatable with the turbine, and a power gearbox. The power gearbox is mechanically coupled to both the fan shaft and the turbomachine shaft such that the fan shaft is rotatable by the turbomachine shaft across the power gearbox. The power gearbox includes a gear. The gas turbine engine also includes a torque monitoring system having a gearbox sensor and a shaft sensor. The gearbox sensor is operable with the gear of the power gearbox, and the shaft sensor is operable with at least one of the turbomachine shaft or the fan shaft. The torque monitoring system determines an angular position of the gear of the gearbox relative to at least one of the fan shaft or the turbomachine shaft using the gearbox sensor and the shaft sensor to determine a torque within the gas turbine engine.

In another exemplary embodiment of the present disclosure, a torque monitoring system for a gas turbine engine is provided. The gas turbine engine includes a fan shaft rotatable with a fan, a turbomachine shaft rotatable with a turbine, and a power gearbox mechanically coupled to both the fan shaft and the turbomachine shaft. The torque monitoring system includes a gearbox sensor operable with a gear of the power gearbox when the torque monitoring system is installed in the gas turbine engine. The torque monitoring system also includes a shaft sensor operable with at least one of the turbomachine shaft or the fan shaft when the torque monitoring system is installed in the gas turbine engine. The torque monitoring system determines during operation an angular position of the gear of the gearbox relative to at least one of the fan shaft or the turbomachine shaft using the gearbox sensor and the shaft sensor to determine a torque within the gas turbine engine.

In an exemplary aspect of the present disclosure, a method is provided for determining a torque applied to a power gearbox of a gas turbine engine by a turbomachine shaft of the gas turbine engine. The method includes determining an angular position of a gear of the power gearbox of the gas turbine engine relative to the turbomachine shaft of the gas turbine engine. The method also includes determining an amount of torque applied to the power gearbox by the turbomachine shaft based on the determined angular position of the gear of the power gearbox relative to the turbomachine shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
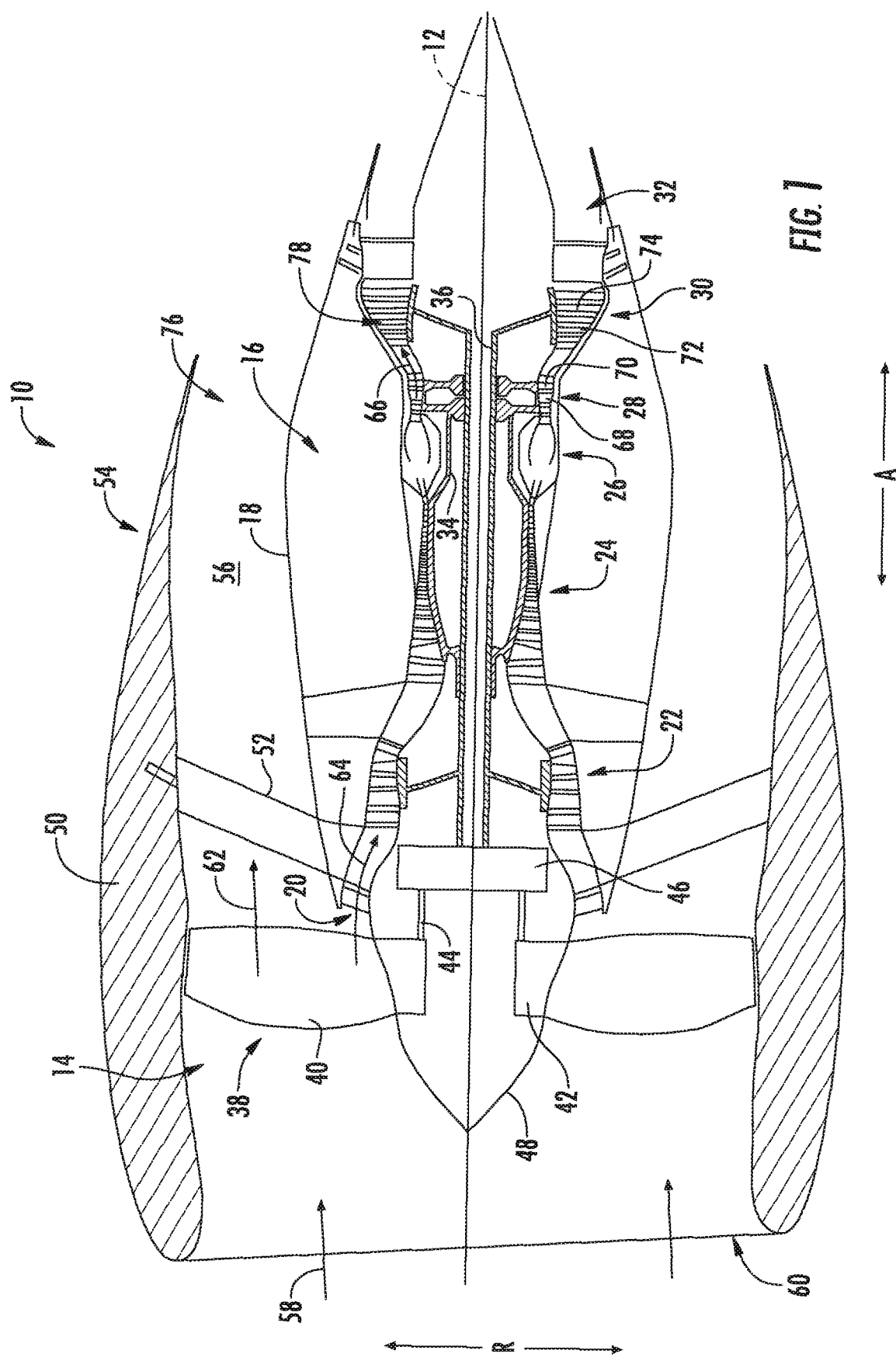
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; see FIGS. 3 and 4). In general, the turbofan 10 includes a fan section 14 and a turbomachinery section 16 disposed downstream from the fan section 14.

The exemplary turbomachinery section 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Additionally, the fan 38 is configured as a fixed-pitch fan, such that each of the fan blades 40 are fixed relative to a pitch axis of the respective fan blade 40. Notably, the disk 42 is, in turn, attached to and rotatable by a fan shaft 44, such that the fan blades 40, disk 42 and fan shaft 44 are together rotatable about the longitudinal axis 12 by LP shaft 36 across a power gear box 46. The power gear box 46 includes a plurality of gears for stepping down a rotational speed of the fan shaft 44 to a more efficient rotational fan speed relative to the LP shaft 36. It should be appreciated, however, that as used herein, the term "shaft" or "spool" does not necessarily require a cylindrical member, and instead may refer to any rotatable structure extending generally along the axial direction A for driving a component of the turbofan engine 10.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachinery section 16. It should be appreciated that the nacelle 50 is supported relative to the turbomachinery section 16 by a plurality of circumferentially-spaced outlet guide vanes 52. Moreover, a downstream section 54 of the nacelle 50 extends over an outer portion of the turbomachinery section 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachinery section 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachinery section 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may include a variable pitch fan; may include any other suitable number of compressors, turbines, or spools; etc. Further, in other exemplary embodiments, aspects of the present disclosure may instead be utilized with, or incorporated into, any other suitable gas turbine engine. For example, in other exemplary embodiments, aspects of the present disclosure may be utilized with, or incorporated into, a turboprop engine, an aeroderivative engine (e.g., for nautical applications), etc.

Figure 2:
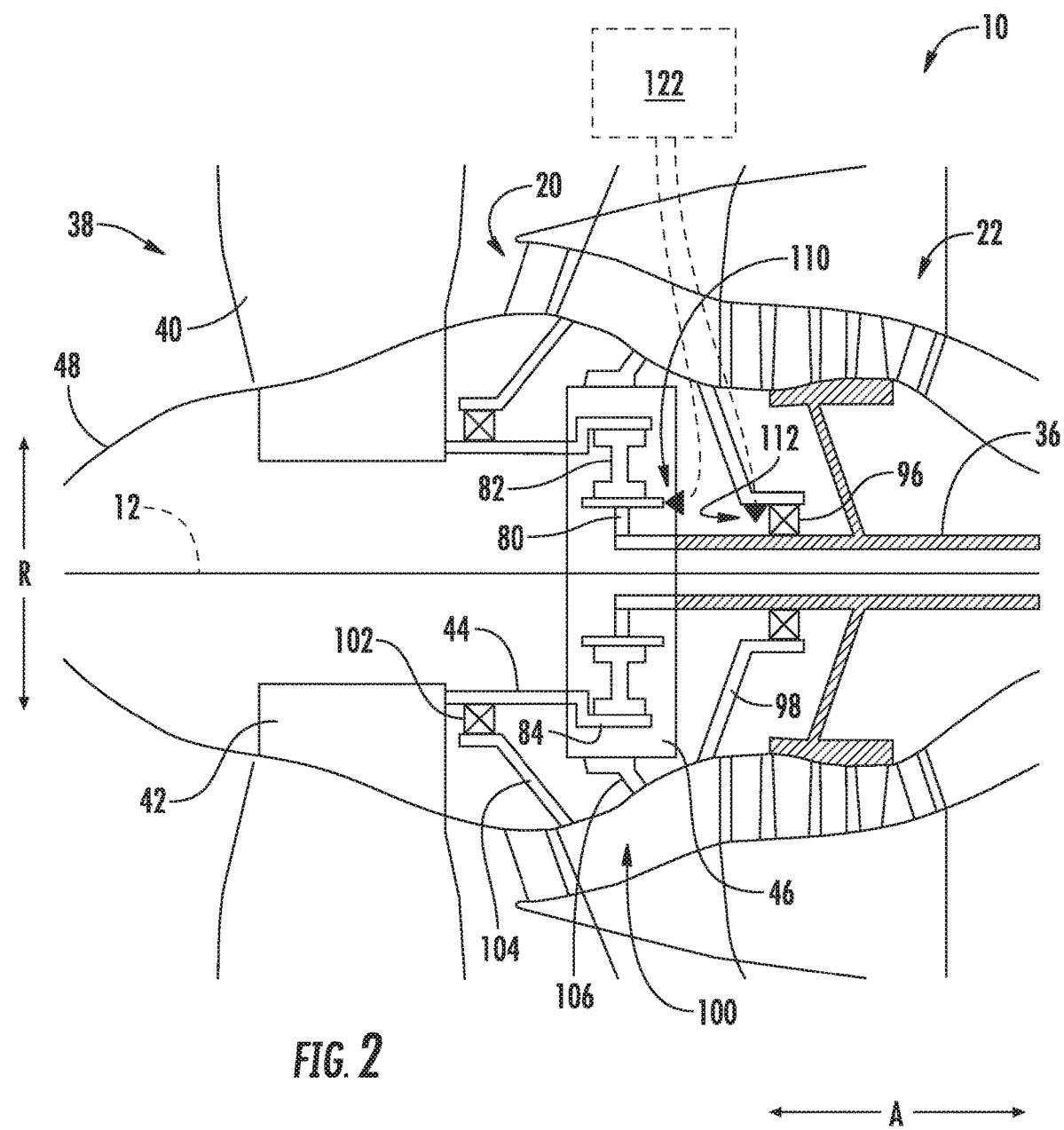
FIG. 2 is a close-up, schematic, cross-sectional view of a forward end of the exemplary gas turbine engine of FIG. 1.

Referring now to FIG. 2, a close-up, schematic view is provided of the forward end of the exemplary turbofan engine 10 of FIG. 1. More specifically, FIG. 2 depicts a portion of the fan 38 of the fan section 14, the LP compressor 22 of the compressor section, and the power gearbox 46.

As stated above, the fan section 14 of the turbofan engine 10 includes the fan 38 rotatable with the fan shaft 44. Additionally, the turbomachinery section 16 includes a turbomachine shaft rotatable with a turbine, or more particularly, the turbomachinery section 16 includes the LP shaft 36 rotatable with the LP turbine 30, as well as with the LP compressor 22. Moreover, the power gearbox 46 is mechanically coupled to both the fan shaft 44 and the LP shaft 36, such that the fan shaft 44 is rotatable by the LP shaft 36 across the power gearbox 46.

For the embodiment depicted, the power gearbox 46 is configured as an epicyclic power gearbox, or more specifically, as a planetary gearbox. For example, referring now also to FIG. 3, providing a schematic, cross-sectional view of the exemplary power gearbox 46 of FIG. 2, the exemplary power gearbox 46 generally includes a sun gear 80, a plurality of planet gears 82, and a ring gear 84. The sun gear 80 is fixedly attached to the LP shaft 36, such that the sun gear 80 rotates with the LP shaft 36. Additionally, the ring gear 84 is, for the embodiment depicted, fixedly connected to the fan shaft 44, such that the ring gear 84 rotates with the fan shaft 44. Each of the plurality of planet gears 82 are attached to a planetary carrier 86. More particularly, each of the plurality of planet gears 82 are rotatably attached to the planetary carrier 86, such that they may rotate relative to the planetary carrier 86 about a respective planet gear axis 88. For the embodiment depicted, the planetary carrier 86 remains stationary within the power gearbox 46.

During operation of the power gearbox 46, a plurality of teeth 90 of the sun gear 80 mesh with a plurality of teeth 92 of the planet gears 82, such that rotation of the sun gear 80 and LP shaft 36 in turn rotates each of the plurality of planet gears 82 about their respective planet gear axes 88. The plurality of teeth 92 of the planet gears 82 also mesh with a plurality of teeth 94 of the ring gear 84, such that rotation of the planet gears 82 about their respective planet gear axes 88 in turn rotate the ring gear 84 and fan shaft 44 about the engine axis 12.

Referring back particularly to FIG. 2, rotation of the LP shaft 36 is supported within the turbomachinery section 16 by one or more bearings. More specifically, for the embodiment depicted, the LP shaft 36 is supported within the turbomachinery section 16 by a thrust bearing 96. The thrust bearing 96 may be configured as a ball bearing, a tapered roller bearing, or any other suitable bearing configured to absorb forces from the LP shaft 36 along the axial direction A. Notably, the thrust bearing 96 is, in turn, supported by a first frame member 98 of a forward frame 100 of the turbofan engine 10.

Similarly, the fan shaft 44 is also supported by one or more bearings. More specifically, the fan shaft 44 for the embodiment depicted is also supported by a thrust bearing 102, the thrust bearing 102, in turn, supported by a second frame member 104 of the forward frame 100 of the turbofan engine 10. As is also depicted, the power gearbox 46 is also supported by the forward frame 100, and more specifically, is supported by a third frame member 106 of the forward frame 100. It should be appreciated, however, that in other exemplary embodiments, the LP shaft 36 may additionally, or alternatively, be supported by any other suitable bearings at any other suitable location, and similarly, the fan shaft 44 may additionally, or alternatively, be supported by any other suitable bearings at any other suitable location. Moreover, in other exemplary embodiments, the thrust bearing 96 supporting the LP shaft 36 may be supported within the turbomachinery section 16 in any other suitable manner, and further, the thrust bearing 102 supporting the fan shaft 44 may also be supported in any other suitable manner.

During certain operations of the turbofan engine 10, it may be beneficial to monitor an amount of torque applied within the turbofan engine 10 to, e.g., ensure the turbofan engine 10 is operating within a desired operational range. Accordingly, the turbofan engine 10 depicted includes a torque monitoring system for measuring an amount of torque applied to the power gearbox 46 from a shaft of the turbofan engine 10, and/or amount of torque applied to the fan shaft 44 from the power gearbox 46.

For the embodiment depicted, the torque monitoring system includes a gearbox sensor 110 operable with a gear of the power gearbox 46 and a shaft sensor 112 operable with at least one of a turbomachine shaft of the turbomachinery section 16 or the fan shaft 44. The torque monitoring system is configured to determine an angular position of the gear of the gearbox 46 relative to at least one of the fan shaft 44 or the turbomachine shaft using the gearbox sensor 110 and the shaft sensor 112 to determine a torque within the turbofan engine 10.

More particularly, for the embodiment depicted, the shaft sensor 112 is operable with the turbomachine shaft, or rather with the LP shaft 36, of the turbofan engine 10 to determine an angular position of the LP shaft 36. More particularly, still, for the embodiment depicted, the shaft sensor 112 is operable with the LP shaft 36 at a location forward of the thrust bearing 96 (the thrust bearing 96 rotatably connected to and supporting the LP shaft 36).

Figure 4:
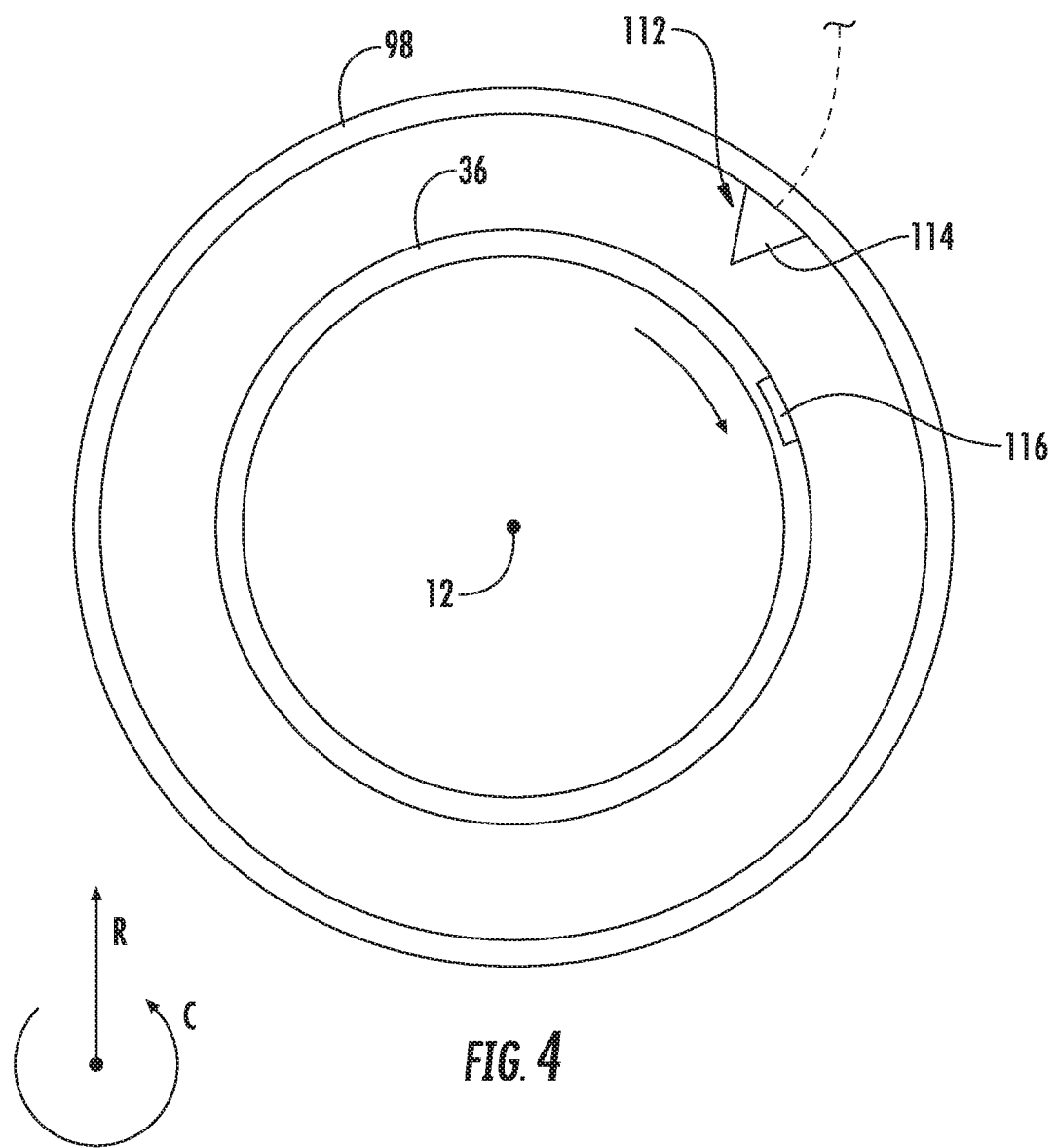
FIG. 4 is a schematic, axial view of a portion of a shaft of the exemplary gas turbine engine of FIG. 1.

More particularly, still, referring now briefly to FIG. 4, a schematic, cross-sectional view along the axial direction A is provided of the shaft sensor 112 of the torque monitoring system, the shaft sensor 112 operable with the LP shaft 36. As is depicted, for the embodiment depicted, the shaft sensor 112 generally includes a detector 114 and a trigger 116. The detector 114 is mounted to the first frame member 98 of the forward frame 100, and the trigger 116 is attached to, formed with, or otherwise defined by the LP shaft 36. The detector 114 is configured to determine when the trigger 116 passes by the detector 114, allowing the torque monitoring system to determine a rotational speed and an angular position of the LP shaft 36 at a given time.

Figure 3:
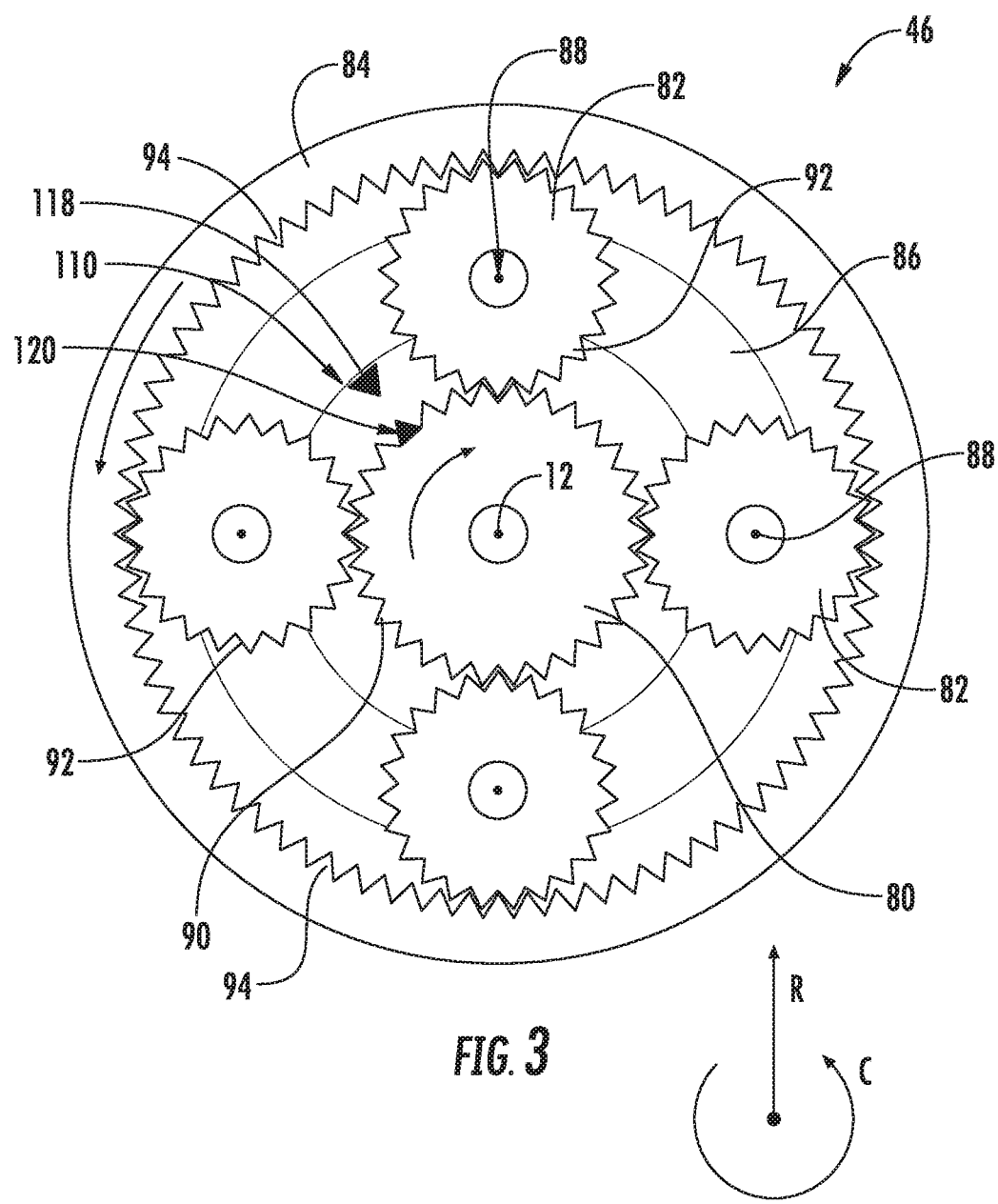
FIG. 3 is a cross-sectional view of a power gearbox of the exemplary gas turbine engine of FIG. 1.

Also for the embodiment of FIG. 2, and referring again briefly to FIG. 3, the gearbox sensor 110 is operable with the sun gear 80 of the power gearbox 46. More particularly, for the embodiment depicted the gearbox sensor 110 is operable with a tooth 90 of the sun gear 80. More particularly, still, similar to the shaft sensor 112, the gearbox sensor 110 generally includes a detector 118 and a trigger 120. The trigger 120 is attached to, formed with, or otherwise defined by a single tooth 90 of the sun gear 80, and the detector 118 is mounted in a fixed location within or proximate to the power gearbox 46. The detector 118 is configured to determine when the trigger 120 passes by the detector 118, allowing the torque monitoring system to determine a rotational speed and an angular position of sun gear 80 of the power gearbox 46 at a given time.

For the embodiment depicted, one or both of the shaft sensor 112 and gearbox sensor 110 may accordingly be configured as a proximity sensor. More specifically, for the embodiment depicted, both of the shaft sensor 112 and the gearbox sensor 110 are configured as a proximity sensor, such as a proximity probe sensor. As used herein, proximity sensor refers to any sensor capable of detecting the presence of an object with or without physical contact. For example, in certain exemplary embodiments, one or both of the shaft sensor 112 and gearbox sensor 110 may be configured as a magnetic proximity sensor (such as a Hall effect sensor), an optical sensor, or any other suitable type or form of proximity sensor. Accordingly, when, for example, one or both of the shaft sensor 112 and gearbox sensor 110 are configured as a Hall effect sensor, the triggers 116, 120 may each be configured as a magnet, and the detectors 114, 118 may each be configured as a transducer configured to vary an output voltage in response to a magnetic field. Alternatively, when one or both of the shaft sensor 112 and gearbox sensor 110 are configured as an optical sensor, the triggers 116, 120 may each be configured as a different colored section on the LP shaft 36 or the sun gear 80, and the detectors 114, 118 may be configured as electro-optical sensors converting light to an electrical signal.

As is also depicted in FIG. 2, the shaft sensor 112 and gearbox sensor 110 are each operably connected to a controller, or control device, 122 of the torque monitoring system. The controller 122 of the torque monitoring system may include one or more controllers of a gas turbine engine (not shown) within which the torque monitoring system is installed, or of an aircraft with which an engine containing the torque monitoring system is provided. As will be discussed in greater detail below, one or both of the shaft sensor 112 and gearbox sensor 110 may be operably connected to the controller 122 using any suitable wired or wireless communication network.

During operation of the torque monitoring system, the torque monitoring system may determine an angular position of the turbomachine shaft relative to the gear of the power gearbox to determine a torque or a horsepower applied to the power gearbox by the turbomachine shaft. For example, the torque monitoring system may use the relative angular position of these components, in combination with a torsional stiffness of the turbomachine shaft and an axial separation between the shaft sensor and the gearbox sensor (i.e., along the axial direction A) to determine the torque applied to the power gearbox by the turbomachine shaft.

It should be appreciated, however, that the exemplary turbofan engine and torque monitoring system described above with reference to FIGS. 2 through 4 are provided by way of example only. In other exemplary embodiments, the turbofan engine and torque monitoring system may be configured in any other suitable manner. For example, the torque monitoring system may be configured with any other suitable gas turbine engine. For example, the power gearbox 46 may instead be an epicyclic power gearbox in a star configuration. Additionally, although each of the shaft sensor 112 and gearbox sensor 110 are depicted in FIGS. 3 and 4 as including a single detector 114, 118, in other exemplary embodiments, one or both of the shaft sensor 112 and gearbox sensor 110 may include a plurality of detectors spaced, e.g., in a circumferential manner. Moreover, referring now to FIGS. 5 and 6, two additional embodiments of the present disclosure are provided.

Figure 5:
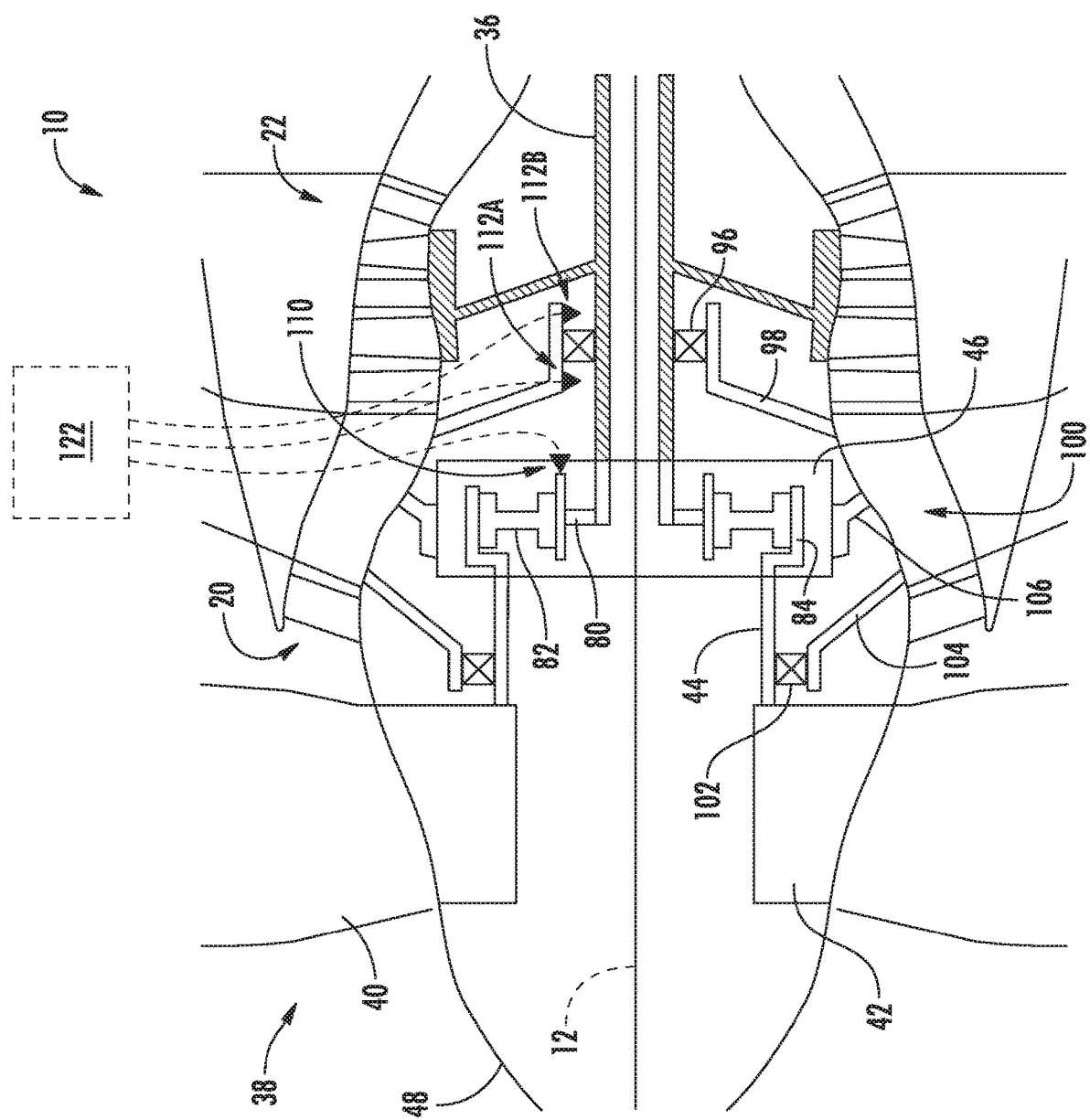
FIG. 5 is a close-up, schematic, cross-sectional view of a forward end of a gas turbine engine in accordance with another exemplary embodiment of the present disclosure.
Figure 6:
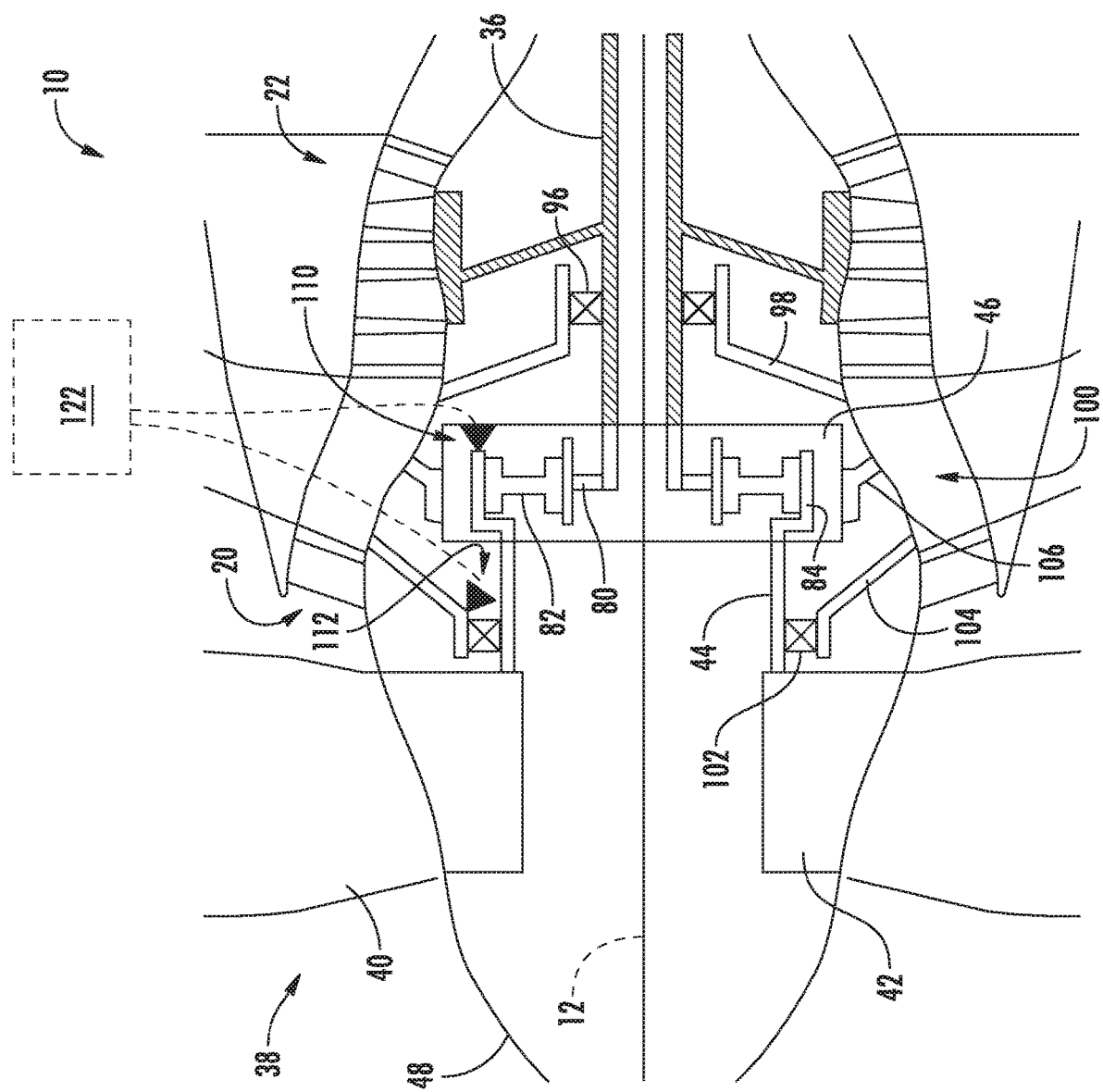
FIG. 6 is a close-up, schematic, cross-sectional view of a forward end of a gas turbine engine in accordance with yet another exemplary embodiment of the present disclosure.

More specifically, FIGS. 5 and 6, each provide a close-up, schematic view of a forward end of a turbofan engine 10 in accordance with another exemplary embodiment of the present disclosure. For example, the turbofan engines 10 depicted in FIGS. 5 and 6 each include a fan section 14 with a fan 38 and a turbomachinery section 16 including an LP shaft 36 driving a fan shaft 44 of the fan 38 across a power gearbox 46. Additionally, each of the turbofan engines 10 depicted in FIGS. 5 and 6 includes a torque monitoring system in accordance with an exemplary embodiment of the present disclosure.

Referring particularly to FIG. 5, for the embodiment depicted, the torque monitoring system includes a gearbox sensor 110 and a shaft sensor 112. The gearbox sensor 110 is operable with a gear of the power gearbox 46, or rather with a sun gear 80 of the power gearbox 46, and the shaft sensor 112 is operable with a turbomachine shaft of the turbofan engine 10, or rather, with the LP shaft 36. More specifically, for the embodiment depicted, the shaft sensor 112 is configured as a first shaft sensor 112A operable with the LP shaft 36 at a location forward of a thrust bearing 96 of the turbofan engine 10, and the torque monitoring system further includes a second shaft sensor 112B. The second shaft sensor 112B is operable with the LP shaft 36 at a location aft of the thrust bearing 96. The second shaft sensor 112B may be configured in substantially the same manner as the first shaft sensor, and may be operably connected to the controller 122. With such a configuration, the torque monitoring system may further monitor a torque on the LP shaft 36 across the thrust bearing 96. As will be appreciated, such may further allow for the torque monitoring system to determine a potential failure of the LP shaft 36 at the thrust bearing 96.

Additionally, referring now particularly to FIG. 6, for the embodiment depicted, the torque monitoring system similarly includes a gearbox sensor 110 and a shaft sensor 112. However, the gearbox sensor 110 is operable with a gear of the power gearbox 46, or rather for the embodiment depicted, with a ring gear 84 of the power gearbox 46, and the shaft sensor 112 is operable with the fan shaft 44 of the fan 38 of the turbofan engine 10. Accordingly, for the embodiment of FIG. 6, the torque monitoring system is configured to monitor a torque applied to the fan shaft 44 of the fan 38 by the power gearbox 46.

Figure 7:
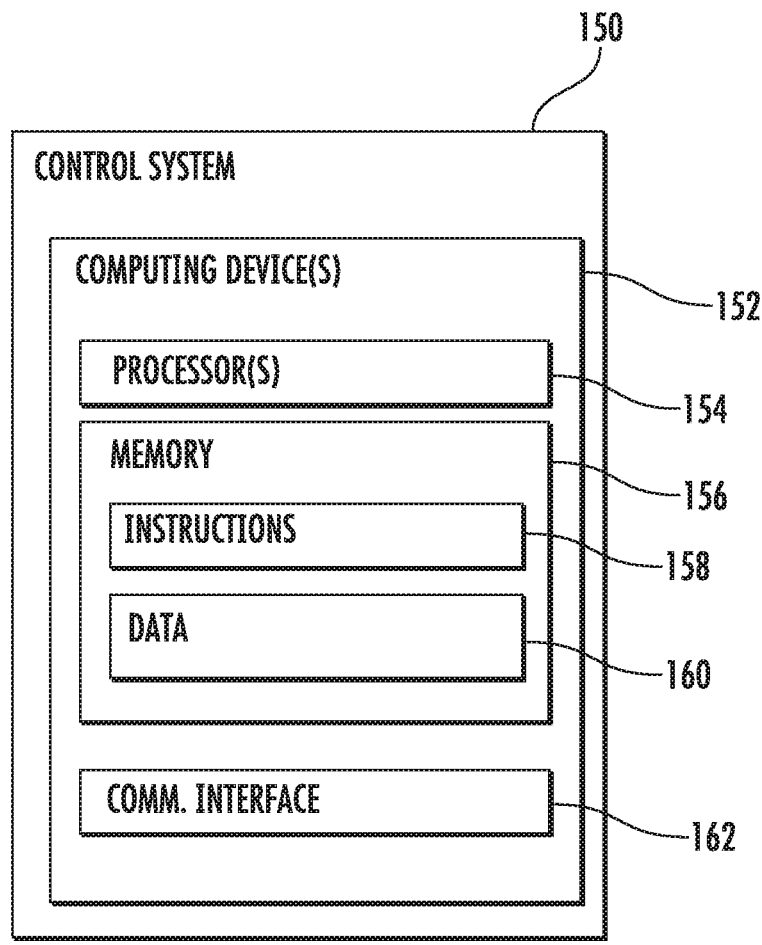
FIG. 7 is a schematic view of a control system in accordance with an exemplary embodiment of the present disclosure.

Referring now to FIG. 7, it should be appreciated that the controller 122 of the torque monitoring system discussed above may be configured as part of a control system 150. For example, FIG. 7 provides a schematic view of a control system 150 in accordance with an exemplary embodiment of the present disclosure. The control system 150 can include one or more computing device(s) 152. Notably, the controllers 122 depicted in FIGS. 2, 5, and 6 may be one of the one or more computing device(s) 152 of the exemplary control system 150 depicted in FIG. 7. The computing device(s) 152 may be configured to execute one or more methods in accordance with exemplary aspects of the present disclosure (such as method 200 described below with reference to FIG. 8). The computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for regulating fuel flow, as described herein, and/or any other operations or functions of the one or more computing device(s) 152. Additionally, and/or alternatively, the instructions 158 can be executed in logically and/or virtually separate threads on processor 154. The memory device(s) 156 can further store data 160 that can be accessed by the processors 154.

The computing device(s) 152 can also include a communications interface 162 used to communicate, for example, with the components of turbofan engine 10, torque monitoring system, and/or other computing device(s) 152. The communications interface 162 can include any suitable components for interfacing with these components or one or more communications network(s), including for example, transmitters, receivers, ports, controllers, antennas, wired communication buses, or other suitable components. Control system 150 may also be in communication (e.g., via communications interface 162) with the various sensors, such as the gearbox sensor 110 and/or shaft sensor 112 described above, and may selectively operate turbofan engine 10 in response to user input and feedback from these sensors.

The technology discussed herein makes reference to computer-based systems and actions taken by and information sent to and from computer-based systems. It should be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 8:
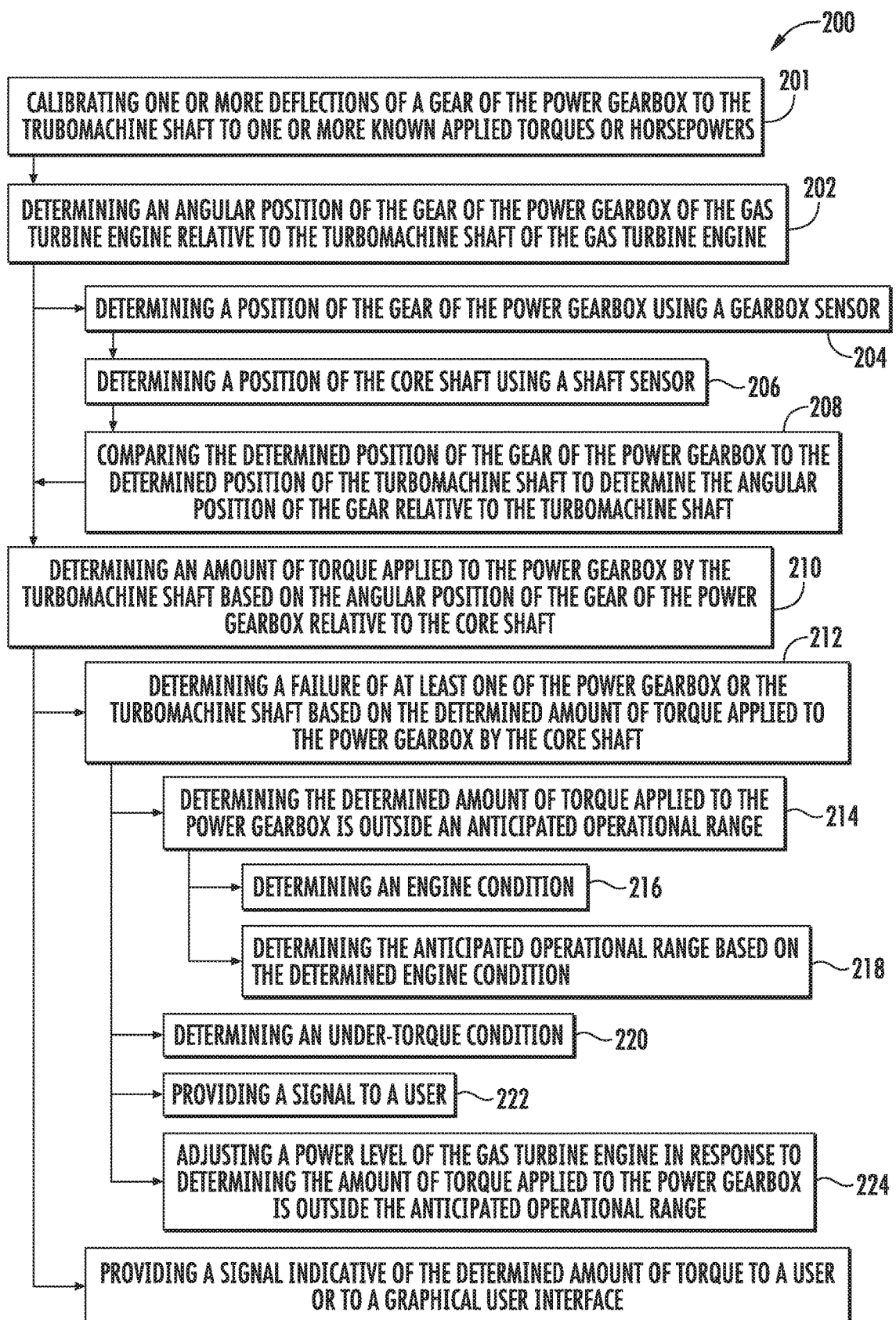
FIG. 8 is a flow diagram of a method for determining a torque applied within a gas turbine engine in accordance with an exemplary aspect of the present disclosure.

Referring now to FIG. 8, the present disclosure further provides a method 200 for determining a torque applied to a power gearbox of the gas turbine engine by a turbomachine shaft of the gas turbine engine. The method 200 may be a computer implemented method, implemented using the control system described above with reference to FIG. 7. Additionally, the exemplary method 200 may utilize one or more of the exemplary torque monitoring systems described above with reference to FIGS. 2 through 6 on a gas turbine engine configured in the same or similar manner as the exemplary turbofan engine 10 described above with reference to FIGS. 1 through 4. Accordingly, the turbomachine shaft may be configured as an LP shaft driving a fan of the gas turbine engine across the power gearbox.

Figure 9:
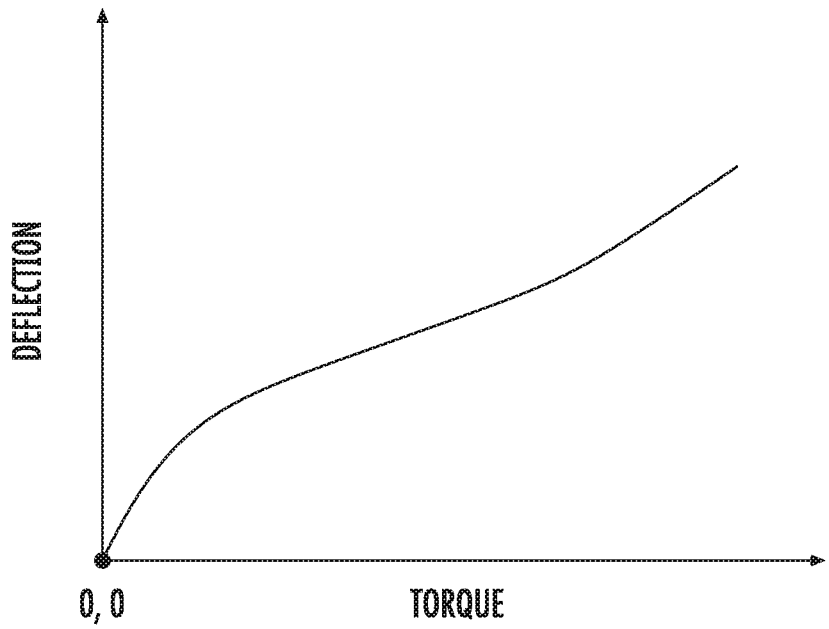
FIG. 9 is a graph depicting a schedule of relative deflections to applied torques in accordance with an exemplary aspect of the present disclosure.

As depicted, the exemplary method 200 includes at (201) calibrating one or more relative deflections of a gear of the power gearbox of the gas turbine engine to the turbomachine shaft of the gas turbine engine to one or more known applied torques or known applied horsepowers. For example, calibrating at (201) may include determining a schedule of relative deflections to applied torques for a particular gas turbine engine, or for a particular model of gas turbine engines. For example, referring briefly to FIG. 9, calibrating at (201) may include determining the schedule depicted relating a deflection of the gear of the power gearbox to the turbomachine shaft to a torque.

Referring still to FIG. 8, the method 200 includes at (202) determining an angular position of a gear of the power gearbox of the gas turbine engine relative to the turbomachine shaft of the gas turbine engine. For instance, in certain exemplary aspects, the one or more computing devices 152 may determine the angular position of the gear of the power gearbox of the gas turbine engine relative to the turbomachine shaft of the gas turbine engine.

More specifically, for the exemplary aspect depicted, determining the angular position of the gear relative to the turbomachine shaft at (202) includes: at (204) determining a position of the gear of the power gearbox using a gearbox sensor; at (206) determining a position of the turbomachine shaft using a shaft sensor; and at (208) comparing the position of the gear of the power gearbox determined at (204) to the position of the turbomachine shaft determined at (206) to determine the angular position of the gear relative to the turbomachine shaft. For instance, in certain exemplary aspects, the one or more computing devices 152 may determine the position of the gear using a gearbox sensor; determine the position of the turbomachine shaft using a shaft sensor; and compare the position of the gear to the position of the turbomachine shaft to determine the angular position of the gear relative to the turbomachine shaft.

Moreover, referring still to FIG. 8, the exemplary method 200 further includes at (210) determining an amount of torque applied to the power gearbox by the turbomachine shaft based on the angular position of the gear of the power gearbox relative to the turbomachine shaft determined at (202). For instance, in certain exemplary aspects, the one or more computing devices 152 may determine the amount of torque applied to the power gearbox by the turbomachine shaft based on the angular position of the gear relative to the turbomachine shaft. In certain exemplary aspects, determining the amount of torque applied to the power gearbox may include determining the amount of torque applied to the power gearbox based on a torsional stiffness of the turbomachine shaft, the angular position of the gear relative to the angular position of the turbomachine shaft, and/or an axial separation of the gearbox sensor and the shaft sensor. Additionally, or alternatively, determining the amount of torque applied to the power gearbox may include determining the amount of torque applied to the power gearbox using the deflection determined at (202) and the deflection schedule calibrated at (201).

Further, it should be appreciated that the exemplary method may utilize the amount of torque determined at (210) in a variety of manners. For example, the exemplary method 200 further includes at (212) determining a failure of at least one of the power gearbox or the turbomachine shaft based on the determined amount of torque applied to the power gearbox by the turbomachine shaft at (210). For instance, in certain aspects, the one or more computing devices 152 may determine a failure of at least one of the power gearbox or the turbomachine shaft based on the determined amount of torque applied to the power gearbox by the turbomachine shaft.

More specifically, for the exemplary aspect depicted, determining the failure of at least one of the power gearbox or the turbomachine shaft at (212) includes at (214) determining the determined amount of torque applied to the power gearbox is outside an anticipated operational range. For instance, in certain exemplary aspects, the one or more computing devices 152 may determine the amount of torque applied to the power gearbox is outside an anticipated operational range for the gas turbine engine. The anticipated operational range may be a range of torque values indicative of normal operation based on one or more operating parameters of the gas turbine engine.

More specifically, still, for the exemplary aspect depicted, determining the determined amount of torque applied to the power gearbox is outside the anticipated operational range at (214) further includes at (216) determining an engine condition, and at (218) determining the anticipated operational range based on the determined engine condition. For instance, in certain exemplary aspects, the one or more computing devices 152 may determine the engine condition, and may determine the anticipated operational range based on the determined engine condition. For example, the engine condition may include one or more of a power level of the gas turbine engine, a compressor exit temperature of the gas turbine engine, a turbine inlet temperature of the gas turbine engine, a core speed of the gas turbine engine, etc.

Notably, for the exemplary aspect depicted, determining the failure of at least one of the power gearbox or the turbomachine shaft at (212) includes at (220) determining an under-torque condition. Such may be indicative of a failure of at least one of the power gearbox or the turbomachine shaft. Additionally, in response to determining the amount of torque applied to the power gearbox is outside the anticipated operational range at (212), the exemplary method 200 of FIG. 8 further includes at (222) providing a signal to a user. For instance, in certain exemplary aspects, the one or more computing devices 152 may provide the signal to the user in response to determining the amount of torque applied to the power gearbox is outside the anticipated operational range. The signal provided to the user at (222) may be a warning signal provided through a graphical user interface of the control system 150, or alternatively, may be any other suitable signal.

Additionally, the exemplary method 200 of FIG. 8 includes at (224) adjusting a power level of the gas turbine engine in response to determining the amount of torque applied to the power gearbox is outside the anticipated operational range at (212). For example, adjusting the power level of the gas turbine engine at (224) may include reducing an amount of fuel provided to the gas turbine engine. For instance, in certain exemplary aspects, the one or more computing devices 152 may reduce the power level of the gas turbine engine in response to determining the amount of torque applied to the power gearbox is outside the anticipated operational range.

Moreover, it should be appreciated, that in still other exemplary aspects, the method 200 may not determine the amount of torque applied to the power gearbox is outside an anticipated operational range of the gas turbine engine at (212), and instead may simply include at (226) providing a signal indicative of the amount of torque determined at (210) to a user or to a graphical user interface of the control system 150. For instance, in certain exemplary aspects, the one or more control devices may provide the signal indicative of the amount of torque determined to a user or to a graphical user interface of the control system 150.

Figure 10:
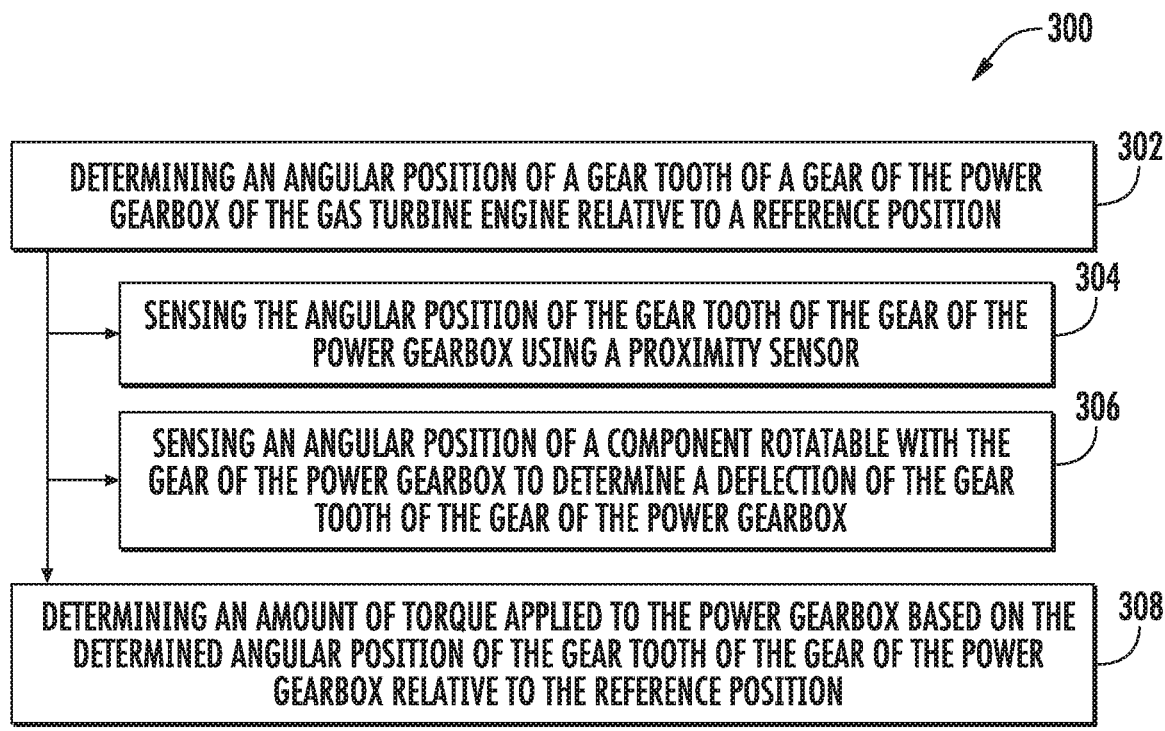
FIG. 10 is a flow diagram of a method for determining a torque applied to a power gearbox of a gas turbine engine in accordance with an exemplary aspect of the present disclosure.

Referring now to FIG. 10, the present disclosure further provides a method 300 for determining a torque applied to a power gearbox of the gas turbine engine. The method 300 may be a computer implemented method, implemented using the control system described above with reference to FIG. 7. Additionally, the exemplary method 300 may be incorporated into one or more of the exemplary gas turbine engines described above with reference to FIGS. 1 through 4.

The exemplary method 300 generally includes at (302) determining an angular position of a gear tooth of a gear of the power gearbox of the gas turbine engine relative to a reference position. The gear may be one or more of a sun gear, ring gear, or planet gear of an epicyclic power gearbox (see, e.g., FIGS. 2 and 3). Additionally, for the exemplary aspect depicted, determining the angular position of the gear tooth of the gear of the power gearbox relative to the reference position at (302) includes at (304) sensing the angular position of the gear tooth of the gear of the power gearbox using a proximity sensor. The proximity sensor may be configured in a manner similar to the exemplary gearbox sensors described above with reference to FIGS. 2, 3, 5, and 6.

Further, for the exemplary aspect of FIG. 10, determining the angular position of the gear tooth of the gear of the power gearbox relative to the reference position at (302) includes at (306) sensing an angular position of a component rotatable with the gear of the power gearbox to determine a deflection of the gear tooth of the gear of the power gearbox. The component may be a turbomachine shaft of the gas turbine engine, a fan shaft of the gas turbine engine, another gear within the power gearbox, or even the same gear of the power gearbox. Further, it should be appreciated, that for the embodiment depicted, the reference position is a position of the gear tooth of the gear under a no-load condition.

Figure 11:
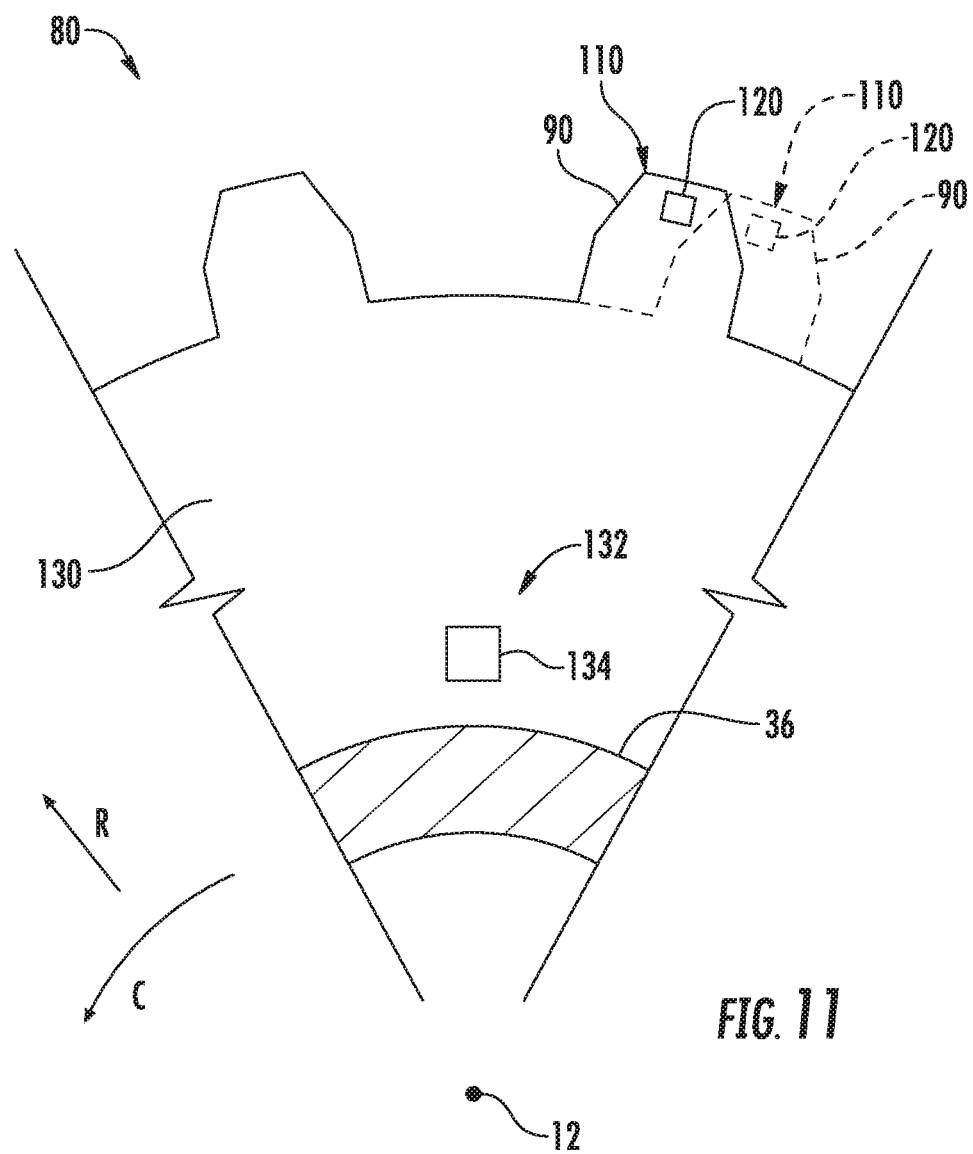
FIG. 11 provides a schematic, axial view of a sun gear of a power gearbox and turbomachine shaft in accordance with an exemplary embodiment of the present disclosure.

For example, referring now briefly to FIG. 11, a schematic, axial view is provided of an exemplary sun gear 80 of a power gearbox 46 and turbomachine shaft (such as LP shaft 36) with which the exemplary method 300 of FIG. 10 may be implemented. As shown, the sun gear 80 includes a plurality of gear teeth 90. Additionally, a first, gearbox sensor 110 is provided, operable with one of the gear teeth 90—the gearbox sensor 110 including a trigger 120 and a detector (not shown). For the embodiment depicted, a reference position of the gear tooth 90 being sensed is shown (i.e., under a no-load condition, and in a no-load position). When a torque is applied to the gearbox 46, however, the gear tooth 90 may deflect due to such load. The deflected gear tooth 90 is shown in phantom. As is depicted a position of the gear tooth 90 relative to a radially inner section of the gear 80 (e.g., a body 130 of the gear 80) changes under the load. Accordingly, for the embodiment depicted, a second sensor 132 (also configured as a proximity sensor including a trigger 134 and a detector, not shown) is provided to determine a position of the component rotatable with the gear (which for the embodiment depicted is the gear itself), such that the relative position/deflection of the gear tooth 90 may be determined.

Referring again to FIG. 10, it should be appreciated that the method 300 further includes at (308) determining an amount of torque applied to the power gearbox based on the angular position of the gear tooth of the gear of the power gearbox relative to the reference position determined at (302). Such may be determined based on the configuration of the gearbox (e.g., torsional stiffness of the gears, separation of the sensors, etc.), or alternatively may be determined based on a schedule of deflection to applied torque for the gearbox and gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a fan section comprising a fan rotatable with a fan shaft;
a turbomachinery section comprising a turbine and a turbomachine shaft rotatable with the turbine;
a power gearbox mechanically coupled to both the fan shaft and the turbomachine shaft such that the fan shaft is rotatable by the turbomachine shaft across the power gearbox, the power gearbox comprising a gear; and
a torque monitoring system comprising a gearbox sensor and a shaft sensor, the gearbox sensor operable with the gear of the power gearbox, the shaft sensor operable with at least one of the turbomachine shaft or the fan shaft, the torque monitoring system configured to determine an angular position of the gear of the gearbox relative to at least one of the fan shaft or the turbomachine shaft using the gearbox sensor and the shaft sensor, to therefrom determine a torque within the gas turbine engine,
wherein the angular position of the gear is indicative of a deflection of a portion of the gear with respect to another portion of the gear.

2. The gas turbine engine of claim 1, wherein the shaft sensor is operable with the turbomachine shaft to determine an angular position of the turbomachine shaft.

3. The gas turbine engine of claim 2, wherein the power gearbox is an epicyclic gearbox, wherein the gear is a sun gear, and wherein the gearbox sensor is operable with the sun gear of the power gearbox to determine an angular position of the sun gear.

4. The gas turbine engine of claim 3, wherein the sun gear comprises a tooth, and wherein the gearbox sensor is operable with the tooth of the sun gear.

5. The gas turbine engine of claim 1, wherein the turbomachinery section further comprises a thrust bearing, wherein the turbomachine shaft is rotatably connected to the thrust bearing, and wherein the shaft sensor is operable with the turbomachine shaft at a location forward of the thrust bearing.

6. The gas turbine engine of claim 5, wherein shaft sensor is a first shaft sensor, wherein the torque monitoring system further comprises a second shaft sensor, and wherein the second shaft sensor is operable with the turbomachine shaft at a location aft of the thrust bearing.

7. The gas turbine engine of claim 1, wherein the turbine is a low pressure turbine, wherein the turbomachine shaft is a low pressure shaft, and wherein the shaft sensor is operable with the low pressure shaft.

8. The gas turbine engine of claim 7, wherein the turbomachinery section further comprises a low pressure compressor rotatable with the low pressure shaft.

9. The gas turbine engine of claim 1, wherein the torque monitoring system further comprises a controller, wherein the controller is operably connected to the gearbox sensor and the shaft sensor.

10. The gas turbine engine of claim 1, wherein one or both of the shaft sensor and gearbox sensor is configured as a proximity sensor.

11. The gas turbine engine of claim 10, wherein the shaft sensor and the gearbox sensor are each configured as proximity sensors, and wherein each of the shaft sensor and gearbox sensor comprise a detector and a trigger.

12. A torque monitoring system for a gas turbine engine, the gas turbine engine comprising a fan rotatable with a fan shaft, a turbomachine shaft rotatable with a turbine, and a power gearbox mechanically coupled to both the fan shaft and the turbomachine shaft, the torque monitoring system comprising:
a gearbox sensor operable with a gear of the power gearbox when the torque monitoring system is installed in the gas turbine engine; and
a shaft sensor operable with at least one of the turbomachine shaft or the fan shaft when the torque monitoring system is installed in the gas turbine engine, the torque monitoring system configured to determine during operation an angular position of the gear of the gearbox relative to at least one of the fan shaft or the turbomachine shaft using the gearbox sensor and the shaft sensor, to therefrom determine a torque within the gas turbine engine,
wherein the angular position of the gear is indicative of a deflection of a portion of the gear with respect to another portion of the gear.

13. A method for determining a torque applied to a power gearbox of a gas turbine engine by a turbomachine shaft of the gas turbine engine, the method comprising:
determining an angular position of a gear of the power gearbox of the gas turbine engine relative to the turbomachine shaft of the gas turbine engine; and
determining an amount of torque applied to the power gearbox by the turbomachine shaft based on the determined angular position of the gear of the power gearbox relative to the turbomachine shaft,
wherein the angular position of the gear is indicative of a deflection of a portion of the gear with respect to another portion of the gear.

14. The method of claim 13, wherein determining the angular position of the gear of the power gearbox relative to the turbomachine shaft comprises:
determining a position of the gear of the power gearbox using a gearbox sensor; and
determining a position of the turbomachine shaft using a shaft sensor.

15. The method of claim 13, further comprising:
determining a failure of at least one of the power gearbox or the turbomachine shaft based on the determined amount of torque applied to the power gearbox by the turbomachine shaft.

16. The method of claim 15, wherein determining the failure of at least one of the power gearbox or the turbomachine shaft based on the determined amount of torque applied to the power gearbox by the turbomachine shaft comprises:
determining the determined amount of torque applied to the power gearbox is outside an anticipated operational range.

17. The method of claim 16, wherein determining the determined amount of torque applied to the power gearbox is outside the anticipated operational range comprises:
determining an engine condition; and
determining the anticipated operational range based on the determined engine condition.

18. The method of claim 15, further comprising:
providing a signal to a user in response to determining the failure of at least one of the power gearbox or the turbomachine shaft.

19. A method for determining a torque applied to a power gearbox of a gas turbine engine, the method comprising:

determining an angular position of a gear tooth of a gear of the power gearbox of the gas turbine engine relative to a reference position on the gear;

wherein determining the angular position of the gear tooth of the gear of the power gearbox relative to the reference position comprises; sensing the angular position of the near tooth of the gear of the power gearbox using a proximity sensor; and sensing an angular position of a component rotatable with the gear of the power gearbox to determine a deflection of the gear tooth of the gear of the power gearbox relative to the reference position; and determining an amount of torque applied to the power gearbox based on the determined angular position of the gear tooth of the gear of the power gearbox relative to the reference position, wherein the reference position is a position of the gear tooth of the gear under a no-load condition.

* * * * *